(12) United States Patent
Harthauser

(10) Patent No.: US 6,851,494 B2
(45) Date of Patent: Feb. 8, 2005

(54) CRAWLER RUNNING GEAR

(75) Inventor: Werner Harthauser, Wertingen (DE)

(73) Assignee: BAUER Maschinen GmbH, Schrobenhausen (DE)

( * ) Notice: Subject to any disclaimer, the term of this patent is extended or adjusted under 35 U.S.C. 154(b) by 9 days.

(21) Appl. No.: 10/330,532

(22) Filed: Dec. 30, 2002

(65) Prior Publication Data

US 2003/0136592 A1 Jul. 24, 2003

(30) Foreign Application Priority Data

Jan. 4, 2002 (DE) .......................................... 102 00 175

(51) Int. Cl.⁷ .............................................. B62D 55/00
(52) U.S. Cl. ..................................... 180/9.48; 180/9.21
(58) Field of Search ............................ 180/9, 9.1, 9.21, 180/9.23, 9.48; 280/80.1, 781, 797

(56) References Cited

U.S. PATENT DOCUMENTS

| | | | | |
|---|---|---|---|---|
| 3,037,571 A | * | 6/1962 | Zelle | 180/9.48 |
| 3,712,398 A | * | 1/1973 | Althaus | 180/9.48 |
| 3,820,616 A | | 6/1974 | Juergens | |
| 3,894,598 A | * | 7/1975 | Yeou | 180/9.48 |
| 5,598,896 A | | 2/1997 | Haest | |
| 6,145,610 A | | 11/2000 | Gallagnani | |
| 6,719,075 B2 | * | 4/2004 | Kamikawa | 180/9.1 |

FOREIGN PATENT DOCUMENTS

| | | | | |
|---|---|---|---|---|
| EP | 0 803 428 A1 | 10/1997 | ......... | B62D/55/084 |
| JP | 60094877 | 5/1985 | ......... | B62D/55/084 |
| SU | 1698120 A1 | 5/1989 | ......... | B62D/55/084 |

\* cited by examiner

*Primary Examiner*—Lesley D. Morris
*Assistant Examiner*—Matthew Luby
(74) *Attorney, Agent, or Firm*—Jacobson Holman PLLC

(57) ABSTRACT

The invention relates to a crawler running gear, particularly for a construction machine. A mid-section and two crawler supports with in each case a crawler chain are provided. The crawler supports are located along a longitudinal direction on both longitudinal sides of the mid-section and in each case detachably fixed to at least two crossbeams. The crossbeams are displaceably mounted in a transverse direction on the mid-section. For simplifying installation, the crossbeams have on their end directed towards the crawler support an at least zonally conically tapering mounting journal and on the crawler supports are provided mounting holes, which are constructed so as to correspond to the mounting journals of the crossbeams.

11 Claims, 3 Drawing Sheets

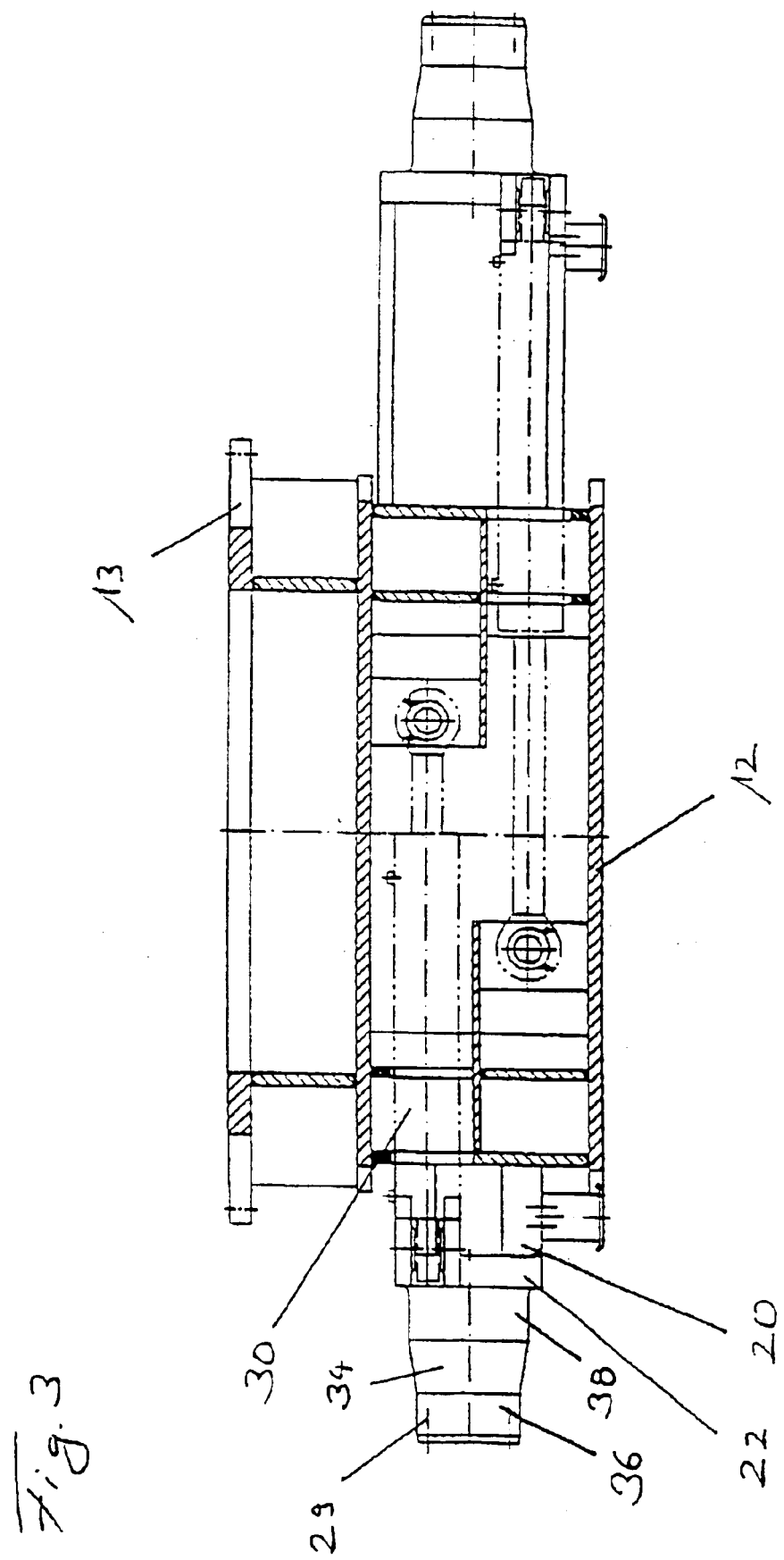

CRAWLER RUNNING GEAR

BACKGROUND OF THE INVENTION

Figure 1:
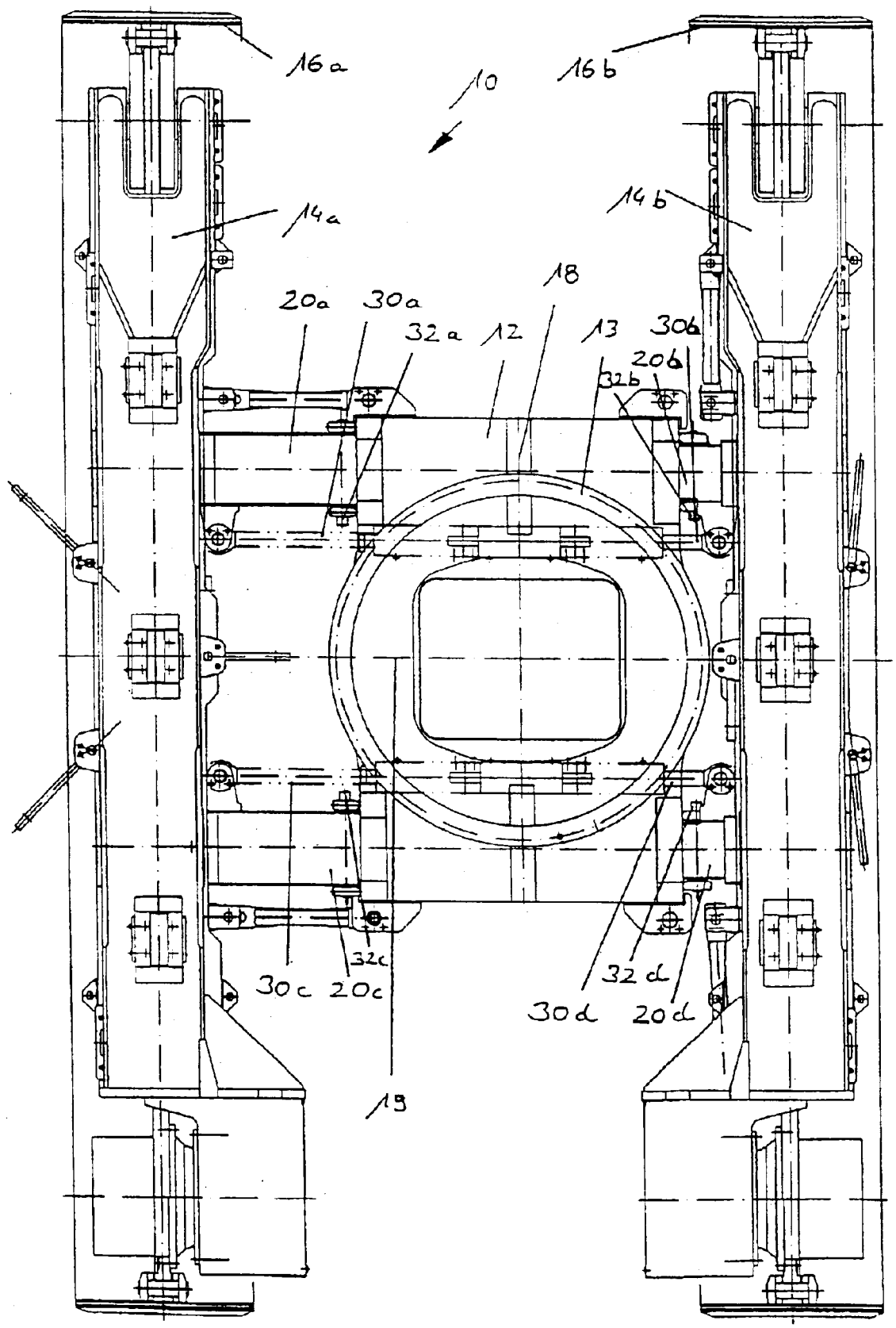

The invention relates to a crawler running gear, particularly for a construction machine, with a mid-section and two crawler supports, the crawler supports being located along a longitudinal direction on both longitudinal sides of the mid-section and are detachably fixed to crossbeams, which are displaceably mounted in a transverse direction on the mid-section. Each of the crossbeams has on its end directed towards the crawler support at least one zonally tapering mounting journal for insertion in mounting holes on the crawler supports as well as to a method for the installation thereof.

Such crawler running gears are more particularly used in construction machines, e.g. excavators, grabs, cranes, bulldozers, etc. as a result of their good cross-country characteristics. For adjusting the track width it is known to move the two crawler supports along the longitudinal sides of a mid-section. This makes it possible to set a maximum track width in operation, which increases the stability of the construction machine. However, a reduction of the track width is advantageous for transporting the construction machine to and from the building site. To increase transportability it is also known to completely remove the crawler supports from the crawler running gear. Thus, the crawler supports can be transported separately from the mid-section, which reduces both the dimensions and the weight of the components to be transported.

A crawler running gear of the aforementioned type is the subject of U.S. Pat. No. 5,598,896. In the known crawler running gear, the crawler supports are each detachably fixed to two displaceable crossbeams via perforated plates and a plurality of threaded bolts.

However, at construction sites, attaching the crawler supports to the crossbeams can be very difficult, since the crawler supports, which are several meters long and weigh several tons, must be precisely adjusted with respect to the crossbeams so that the holes in the perforated plates are aligned with the threaded bolts. Such a precise setting is time consuming. It is also necessary to have special lifting apparatus in order to adjust the tonne-weight crawler supports with respect to the crossbeams with the required degree of precision.

A crawler running gear of the aforementioned type is known from EP 803 428 Al. Over their entire length the displaceable crossbeams have an angular cross-section and are provided on the top of their free ends with a bevel. For installation of the crawler supports once again a very precise alignment of the crossbeams is necessary. It is also difficult to produce a precise bevel.

SUMMARY OF THE INVENTION

The object of the invention is to provide a simply constructed crawler running gear, where removable crawler supports can be installed in simple manner, but still in a precise way, even at a construction site, on the crossbeams.

For the crawler running gear, each of the crossbeams is provided with a mounting end having an outwardly directed conically tapering mounting journal for insertion in mounting or locating holes on the crawler supports.

A fundamental idea is to use displaceable crossbeams for track width adjustment for the active adjustment of the crawler supports as a result of the special construction of conical mounting journals and mounting holes.

The diameter of the mounting hole of the crawler support increases in the direction of the crossbeam. The entrance diameter of the mounting hole is significantly greater than the external diameter of the mounting journal at the free end of the crossbeam. This conical arrangement of the mounting journal and the mounting hole permits an easy insertion of the mounting journal in the mounting hole during crossbeam displacement. Thus, initially the crawler support does not have to be precisely adjusted with respect to the crossbeams. In fact a precise centering is only obtained during crossbeam displacement and on inserting the mounting journal in the mounting holes. In the extended end position the mounting journals in the correspondingly constructed mounting holes form a positive fit. The fit areas can be formed by cylindrical areas on the mounting journal and mounting hole. This ensures a centering of the crawler supports on the crossbeams. After precisely adjusting the crawler supports to the crossbeams, the crawler supports can be fixed using suitable connecting elements.

According to a preferred embodiment of the invention hydraulic cylinders are provided for crossbeam displacement. The hydraulic cylinders, which can also be used for track width adjustment, on introducing the conical mounting journals into the mounting holes provide the necessary force for crawler support displacement by a few millimeters or even a few centimeters at right angles to the crossbeam movement direction, thereby bringing about centering.

In principle, the hydraulic cylinders can be directly articulated to the crawler supports. However, in order to further simplify installation and adjustment, according to the invention the hydraulic cylinder is on the one hand connected to the associated crossbeam and on the other to the mid-section. Normally each crossbeam has one or two hydraulic cylinders.

Preferably each crawler support is fixed to two crossbeams. However, in certain cases there may be one or several crossbeams per crawler support.

According to the invention particularly good crossbeam guidance in the mid-section is brought about by a guide spar of the crossbeam. The guide spar is displaceably mounted in the mid-section, and is given an angular, particularly quadrangular cross-section. As a result of such an angular guide a reliable axial displaceability is obtained, while at the same time preventing twisting.

The conically tapering design of the journal is particularly important for bringing about a desired insertion in the correspondingly constructed mounting hole. From the production standpoint, the invention provides for the mounting journal to have a round cross-section. Thus, the mounting journal and the associated mounting hole can be easily manufactured on a lathe or with a milling cutter or drill in the customary way. Round cross-sections also allow particularly high manufacturing tolerances.

Further simplification of installation is achieved according to the invention in that on the crawler supports, the mid-section or the crossbeams are provided holding shackles with slotted holes, which are constructed for initially adjustable holding of the crawler support. Along each longitudinal side of the crawler running gear are provided at least two slotted holes extending in the longitudinal direction and preferably located on the crawler supports. On assembling the crawler running gear at the construction site, first the mid-section is set down and underpinned with a corresponding mounting support. The two crawler supports are then aligned along the crawler running gear and connected by the holding shackles to the crossbeams of the lower chassis. The holding shackles have on the crawler support side a slotted hole in order to compensate for the spacing difference during crossbeam extension. Then, by means of the hydraulic cylinders, the crossbeams are extended, so that the mounting journals engage in the mounting holes of the crawler support. For the retention of the crawler supports locking bolts corresponding to the locking shackles are fitted to a fixed component of the remaining crawler running gear.

Therefore the holding shackles with the slotted holes allow an initially roughly adjusted holding of the crawler supports and on extending the crossbeams and retracting the mounting journals into the mounting holes the crawler support displaceability necessary for centering is not impaired.

For fixing the centered crawler supports to the crossbeams, according to the invention there is a screw connection for a non-positive connection of the crawler supports to the crossbeams. As the tonne-weight crawler support is precisely centered after inserting the mounting journals in the mounting holes, the threaded bolts can be easily used in the aligned through bores and tapped holes. For securing the individual threaded bolts, it is possible to use retaining rings and guards.

It is also advantageous according to the invention that for fixing a track width in each case a connecting pin is provided between the crossbeam and mid-section. Corresponding to the possible and normally standardized track widths, the crossbeams contain through holes, which can be penetrated by connecting pins. This brings about a reliable positioning of the crossbeam on the mid-section.

Preferably the connecting pin is installed in the crossbeam with a fit and is laterally guided on the mid-section by a flattening of a bolt head and a bolt base. In the vertical direction the connecting pin can move in order to provide clearance compensation between the crossbeam and mid-section loading conditions.

DESCRIPTION OF PREFERRED EMBODIMENTS

The invention is described in greater detail hereinafter relative to preferred embodiments and the attached drawings, wherein show:

FIG. 1 A diagrammatic plan view of a crawler running gear according to the invention.

Figure 2:
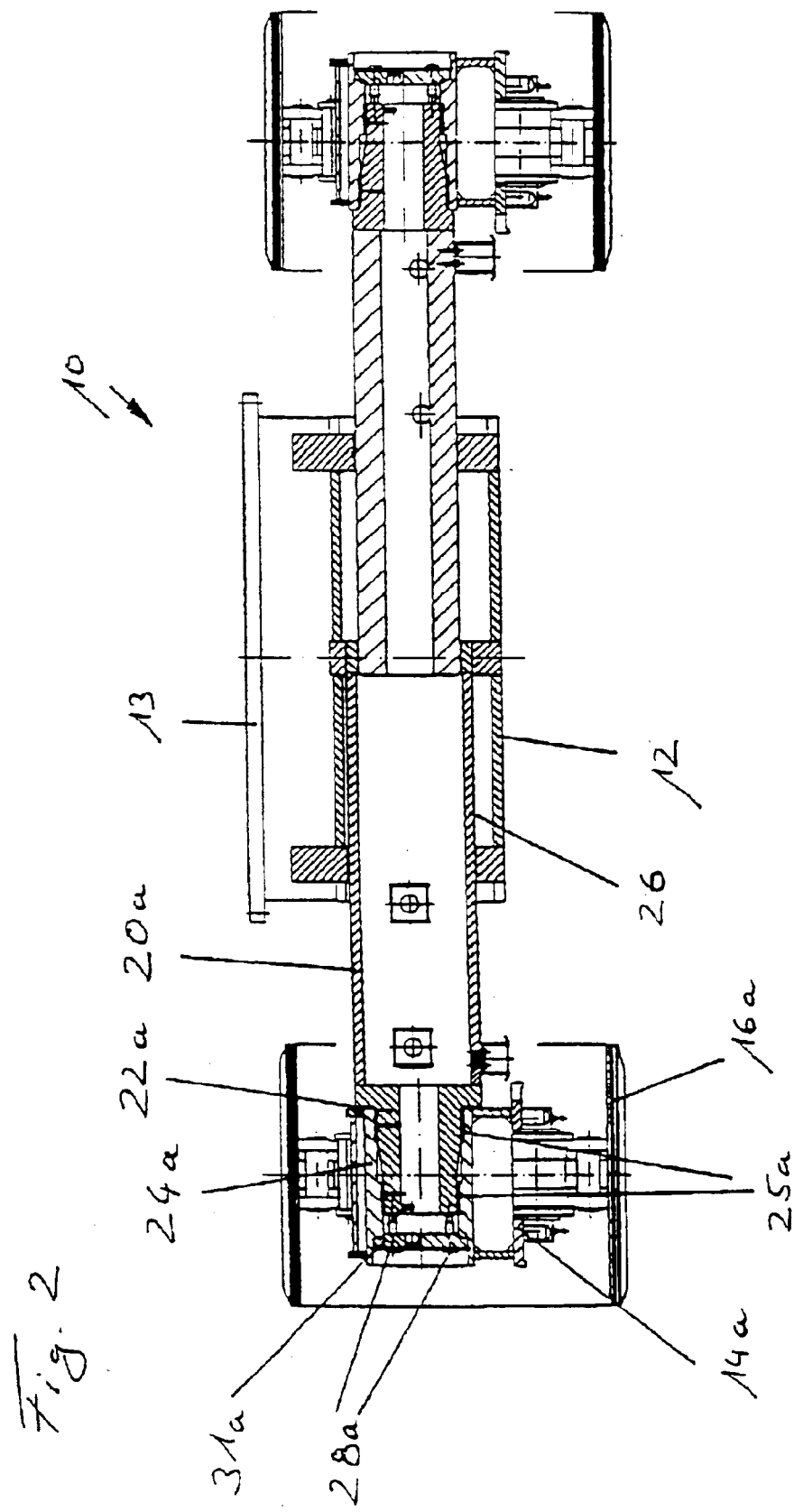

FIG. 2 A diagrammatic cross-sectional view through the crawler running gear according to FIG. 1 on crossbeams.

FIG. 3 A modified cross-sectional view through a crawler running gear according to the invention with the crawler supports dismantled.

According to FIG. 1 a crawler running gear 10 according to the invention comprises a box-like mid-section 12, on whose top is located a slewing ring 13 for the rotary reception of an upper chassis. On both longitudinal sides along a longitudinal direction 18 of the crawler running gear 10 are in each case provided one crawler support 14a, 14b each with a respective crawler chain 16a, 16b. The crawler supports 14a, 14b are held by in each case two crossbeams 20a, 20c or 20b, 20d, which are in turn displaceably mounted in the mid-section 12 in a transverse direction 19 perpendicular to the longitudinal direction 18.

FIG. 1 shows the right hand side crawler support 14b in its retracted position with respect to the mid-section 12. This position is e.g. appropriate for the transportation of a construction machine with the inventive crawler running gear from or to the building site if the crawler supports 14a, 14b remain on the crawler running gear. For adjusting and extending the crawler supports 14a, 14b into an extended position, as illustrated by the left hand side crawler support 14a in FIG. 1, hydraulic cylinders 30a, 30b, 30c, 30d are provided for each of the crossbeams. For the positional fixing of each crossbeam 20a–20d in the selected position for each crossbeam 20 there is a corresponding connecting pin 32a–32d, which passes through the particular crossbeam 20 and corresponding holding plates of the mid-section 12.

FIGS. 2 and 3 illustrate the much easier installation attainable through the invention on installing the removable crawler support 14. For this purpose a mounting journal 22 is fitted on the free end of each crossbeam 20 directed towards the crawler support 14. The mounting journal 22 has a design tapering to the free end with a first, smaller diameter centering area 36 and a second, larger diameter centering area 38, as well as an intermediate, conical area 34.

Following the rough fixing of a crawler support 14 for installation with respect to the mid-section 12, the crossbeam 20 is extended and the beveled, smaller diameter centering area 36 of the mounting journal 22 can easily be introduced into the larger diameter area of a stepped mounting hole 24a on the crawler support 14. With increasing penetration of the mounting journal 22 into the mounting hole 24, the conical area 34 on the mounting journal 22 ensures that the crawler support 14 is moved to an ever greater extent into the precise central position with respect to the crossbeam 20.

In the end position shown in FIG. 2, the cylindrical centering areas 36, 38 engage in accurate fitting manner on the centering bushes 25a of the mounting hole 24a. On the end face of the mounting journal 22 are provided tapped holes 29, into which can be turned threaded bolts for forming a screw connection 28a and lock the mounting journal 22a and consequently the crossbeam 20a against a cover 31a of the crawler support 14a, so as to ensure a reliable, firm connection.

The hydraulically adjustable crossbeams 20, which are displaceably mounted in the mid-section with the guide spar 26 remote from the mounting journal 22, can be used according to the invention for an active centering of the crawler support 14, which significantly facilitates the installation of the tonne-weight crawler support 14 at a construction site.

What is claimed is:

1. A crawler running gear for a machine with a mid-section and two crawler supports mounted on longitudinal sides of the mid-section, the crawler running gear comprising:

crossbeams emanating from the mid-section for detachably mounting the crawler supports, the crossbeams being displaceably mounted in a transverse direction of the mid-section;

each of the crossbeams having a mounting end for receiving a complementary mounting hole defined in said crawler supports;

each of the mounting ends having an outwardly directed tapering mounting journal for insertion in one of the mounting holes on the crawler supports, wherein the tapering of the mounting journal is conically shaped with a round cross-section and on the crawler supports, the mounting holes are in the form of bores that are constructed so as to correspond to the shape of the mounting journals of the crossbeams to thereby center the mounting holes on the crossbeams.

2. The crawler running gear according to claim 1, wherein hydraulic cylinders are provided for the displacement of the crossbeams.

3. The crawler running gear according to claim 1, wherein the hydraulic cylinders are each connected on the one hand to the associated crossbeam and on the other to the mid-section.

4. The crawler running gear according to claim 1, wherein each crawler support is fixed to two crossbeams.

5. The crawler running gear according to claim 1, wherein a guide span of the crossbeam, which is displaceably mounted in mid-section, has an angular cross-section.

6. The crawler running gear according to claim 1, wherein the mounting journal has a first, cylindrical centering area and a larger diameter, second, cylindrical centering area, between which is provided a conical area.

7. The crawler running gear according to claim 1, wherein on the crawler support, mid-section or crossbeams are provided holding shackles with slotted holes, which are constructed for an initial adjustable holding of the crawler support.

8. The crawler running gear according to claim 1, wherein there is a screw connection for a non-positive connection of the crawler supports to the crossbeams.

9. The crawler running gear according to claim 1, wherein for fixing a track width in each case a connecting pin is provided between the crossbeam and mid-section.

10. The crawler running gear according to claim 5, wherein the angular cross-section is a quadrangular cross-section.

11. Method for the installation of the crawler running gear according to claim 1, comprising the steps of:
- holding the crawler supports in a displaceable manner with respect to the mid-section;
- extending the crossbeams with the conical mounting journals into the mounting holes of the crawler supports so that the mounting journals are centered in the mounting holes.

* * * * *